United States Patent [19]
Feilchenfeld

[11] Patent Number: 4,590,604
[45] Date of Patent: * May 20, 1986

[54] VOICE-RECOGNITION ELEVATOR SECURITY SYSTEM

[75] Inventor: Michal M. Feilchenfeld, Pittsburgh, Pa.

[73] Assignee: Westinghouse Electric Corp., Pittsburgh, Pa.

[*] Notice: The portion of the term of this patent subsequent to Aug. 6, 2002 has been disclaimed.

[21] Appl. No.: 457,788

[22] Filed: Jan. 13, 1983

[51] Int. Cl.⁴ .............................. G10L 1/00
[52] U.S. Cl. .................... 381/42; 364/513.5; 364/424
[58] Field of Search ............ 381/42, 43, 110; 364/513, 424

[56] References Cited
U.S. PATENT DOCUMENTS 4,100,370  7/1978  Suzuki et al. .............. 381/42
4,516,207  5/1985  Moriyama et al. .......... 381/42

Primary Examiner—E. S. Matt Kemeny
Attorney, Agent, or Firm—D. R. Lackey

[57] ABSTRACT

A voice-controlled elevator security system. Access to an elevator system servicing a plurality of landings of a structure is controlled by comparing a voice signal of a potential user of the elevator system with stored voice signals of all authorized users. The comparison is accomplished by first digitizing the potential user's voice signal and comparing it, on a bit-by-bit basis, with a digital representation of the voice signals of all authorized users. If the comparison satisfies an established criterion, the potential user is determined to be an authorized user. Once this determination has been made, the authorized user can initiate car call signals for those landings to which the authorized user is permitted access. An authorized user can also temporarily modify the previous digital representation of the voice signal when the authorized user is suffering from laryngeal indisposition.

5 Claims, 3 Drawing Figures

VOICE-RECOGNITION ELEVATOR SECURITY SYSTEM

BACKGROUND OF THE INVENTION

1. Field of the Invention

This invention relates generally to elevator security systems employing a voice-recognition device to control access to the elevator car, and more particularly to such a voice-recognition device that can be effective even when the user is suffering a throat affliction that changes the user's vocal characteristics.

2. Description of the Prior Art

Although the chief responsibility of the elevator attendant in older elevator systems was to operate the elevator car, the elevator attendant also provided a degree of security by limiting access to authorized, or at least familiar, passengers. With the advent of the user-operated elevator system, and the demise of the elevator attendant, it has become necessary to provide an elevator security system to insure that only authorized personnel have access to the elevator car. Access control is critical in high-rise office buildings and especially in living units where the elevator system must operate twenty-four hours a day. It is impossible for building security personnel to effectively monitor elevator use and prohibit unauthorized users from gaining access to an elevator car with today's widespread use of multi-car elevator systems. Obviously, the problem of unauthorized use is especially critical in landings above the main landing where security personnel are not routinely stationed.

For comprehensive protection, an elevator security system must control use of the elevator car in two different situations. First, the security system must detect a hall call initiated by an unauthorized user at any landing. The elevator system should not respond to such calls thereby preventing the unauthorized user from gaining access to an elevator car. Second, once an authorized user has entered an elevator car and initiated a car call to the desired landing, by actuating the proper switch, the security system must insure that the authorized user is permitted access to the landing selected. If the authorized user is prohibited access to the selected landing the car call should be disregarded. Furthermore, the security system should be designed such that unauthorized users do not gain access to an elevator car or landing by simply observing an authorized user entering a code or by obtaining the code through other deceptive means.

One prior art elevator security system is disclosed in a commonly assigned U.S. Pat. No. 4,534,056 entitled "Voice Recognition Elevator Security System" (Ser. No. 411,792 filed Aug. 26, 1982). The application discloses a system that controls access to an elevator system by analyzing the user's voice signal and comparing the results with the voice signals of all authorized users stored in memory. One expected problem with such a recognition system is the failure to recognize an authorized user due to changes in the authorized user's vocal characteristics. This problem is overcome by the present invention whereby the stored signals can be temporarily modified when the user is suffering from laryngeal indisposition (i.e. sore throat), that causes changes in the user's voice patterns. These and other advantages of the present invention are discussed below in the description of the preferred embodiments.

SUMMARY OF THE INVENTION

A voice-controlled elevator security system is disclosed. Authorized users provide template voice signals for digital storage in a memory. The user wishing to gain access to the elevator system provides a voice signal by simply reciting one or more of the words stored in the memory. The system compares the user's voice signal with all the template voice signals to determine if a match exists between the user's voice signal and any of the template voice signals. If a match, within predetermined limits, is found an enable signal indicates the user is an authorized user. The enable signal controls operation of the elevator system thereby controlling user access to an elevator car and to the landings serviced by the elevator system. To ensure proper operation under all conditions, the template voice signals can be temporarily modified when the user suffers from laryngeal indisposition that changes the user's voice patterns.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENT

This invention is an improvement to the earlier filed and commonly assigned U.S. Pat. No. 4,534,056 entitled "Voice-Recognition Elevator Security System" (Ser. No. 411,792, filed Aug. 26, 1982). This earlier filed application is hereby incorporated by reference. For details of the elevator security system in excess of those included herein, reference should be made to the previously filed application.

Figure 1:
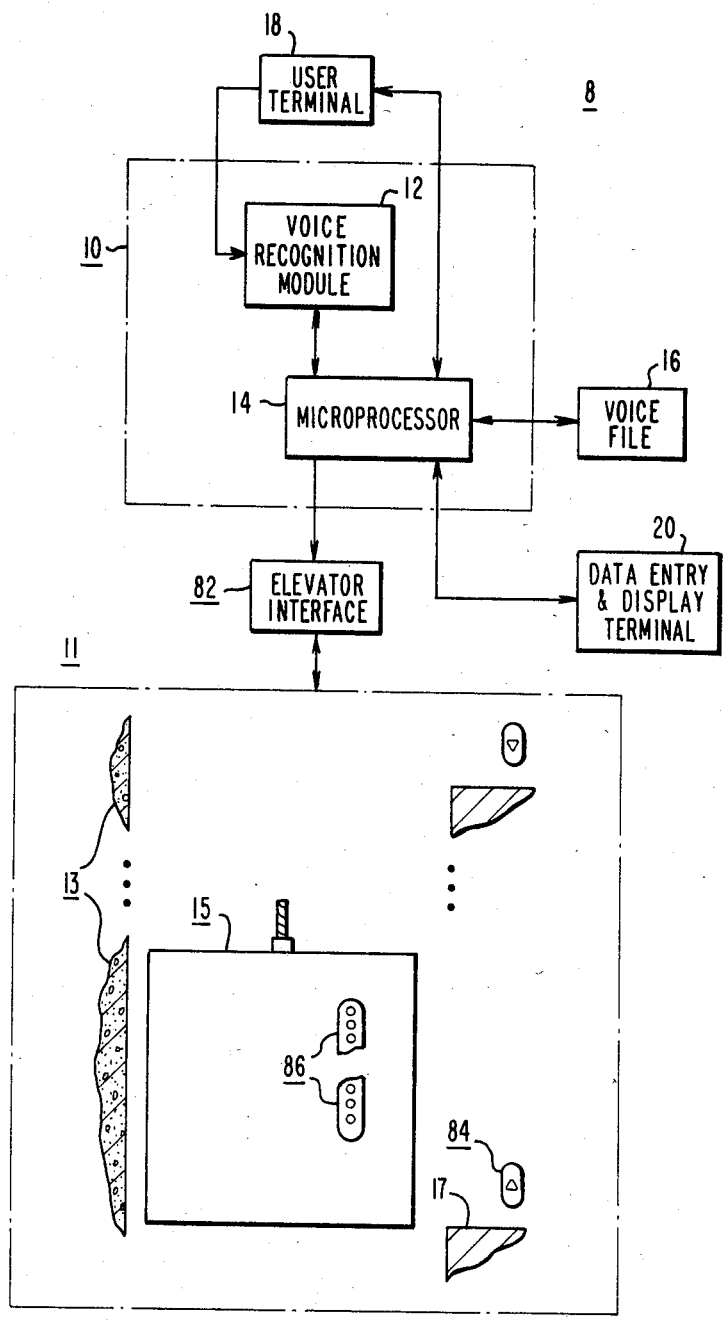
FIG. 1 is a block diagram of an elevator security system constructed according to the teachings of the present invention.

An elevator security system 8 constructed according to the teachings of the present invention is shown in FIG. 1. The elevator security system 8 comprises a main cabinet 10, a user terminal 18, a data entry and display terminal 20, and a voice file 16. An output signal from the main cabinet 10 controls an elevator system 11 having an elevator car 15. The main cabinet 10 should be inaccessible to elevator users and should therefore be located in a secure area of the building 13 serviced by the elevator system 11. The user terminal 18 should be located near the hall call switch 84 on the lobby or lowest floor 17 serviced by the elevator system 11. The main cabinet 10 comprises a microprocessor 14 and a voice recognition module 12 that is bidirectionally responsive to the microprocessor 14.

The microprocessor 14 is also bidirectionally responsive to the voice file 16, the data entry and display terminal 20, and the user terminal 18. The voice recognition module 12 is responsive to the user terminal 18. The microprocessor 14 produces the control signals for controlling operation of the elevator system 11.

The voice-controlled elevator security system 8 controls elevator system 11 by comparing the words spoken by a person desiring to use the elevator system with template words previously spoken by all authorized users and stored in the voice file 16. If the spoken words match the stored template words, to a predetermined degree, a determination is made that the user is an authorized user and access to the elevator system 11 is therefore gained. The microprocessor 14 controls operation of the voice-controlled elevator security system 8, and the voice recognition module 12 compares the spoken words of the user with the template words of all authorized users stored in the voice file 16.

In operation, a user utters a series of words at the user terminal 18 located on the lobby or lowest floor 17 of the building 13 being serviced by the elevator system. The words do not necessarily have to be grammatical English words; they can be any identifiable utterance from which significant characteristic features can be extracted. In the user terminal 18, the words are converted to an analog electrical signal that is input to the voice recognition module 12. Analog-to-digital conversion occurs in the voice recogntion module 12. Template words are transferred from the voice file 16, a non-volatile memory, to the voice recognition module 12 via the microprocessor 14. In the voice recognition module 12 the template words are compared with the spoken words of the user. If there is sufficient agreement between the spoken words and the template words the voice recognition module 12 provides an appropriate signal to the microprocessor 14, and in turn the microprocessor 14 enters an up call at the hall call terminal 84 on the lowest or lobby floor 17. In addition, the microprocessor 14 enables only those car call switches 86 in the elevator car 15 representing the floors to which the authorized user is permitted access.

The data entry and display terminal 20 interacts with the microprocessor 14 to determine the operational mode of the voice-controlled elevator security system 8 and to display status information. Before the voice-controlled elevator security system 8 can be operable, template words of the authorized users must be entered into the voice file 16. This is also accomplished using the data entry and display terminal 20.

Figure 2:
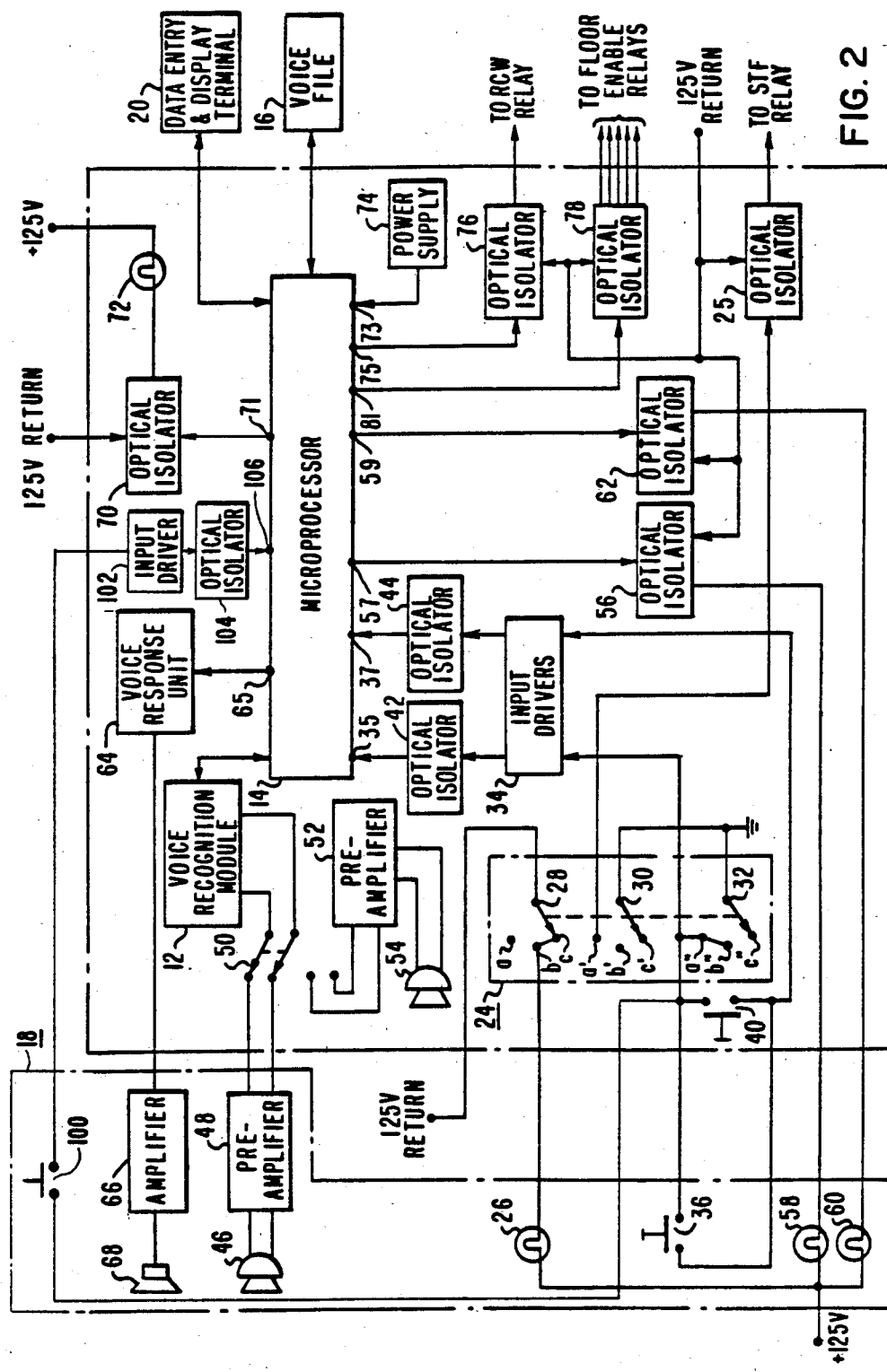
FIG. 2 is a partial schematic and partial block diagram of the elevator security system of FIG. 1.

FIG. 2 illustrates the voice-controlled elevator security system 8 in more detail. The components of FIG. 2 are identical in structure and function to the components bearing identical reference characters in FIG. 1. The mode switch 24, having three positions designated "a", "b", and "c", is located in the main cabinet 10 and determines the operational mode of the voice-controlled elevator security system 8. When the mode switch 24 is in position "a", the voice-controlled elevator security system 8 operates in a secure mode; the user terminal 18 and the main cabinet 10 are operational to determine if the user is an authorized user. In the secure mode, the microprocessor 14 provides appropriate signals to the elevator system 11 for control thereof. In position "b", the voice-controlled elevator security system 8 is in a train and test mode. In this mode the main cabinet 10 is activated, but no control over the elevator system 11 is exercised. The train and test mode is used for loading the template words into the voice file 16, training a new user, permanently updating the template words, and testing the voice-controlled elevator security system 8 to insure that the voice-controlled elevator security system 8 can properly identify authorized users. In the operational mode provided by position "c", the voice-controlled elevator security system 8 is deactivated and the elevator system 11 functions in the normal manner.

Continuing wih a description of the mode switch 24, a terminal b thereof is connected to a terminal c thereof, and the terminal b is connected to a positive 125 volt power supply (not shown in FIG. 2) via a VOICE OPERATION DEACTIVATED lamp 26. A wiper terminal 28 of the mode switch 24 is connected to a 125 volt power supply return circuit (not shown in FIG. 2). A terminal a' of the mode switch 24 is connected to an STF relay (not shown in FIG. 2) via an optical isolator 25. A ground terminal of the optical isolator 25 is connected to the positive 125 volt power supply return circuit. The STF relay, together with other relays not shown in FIG. 2, controls operation of the elevator system 11. A wiper terminal 30 is connected to a wiper terminal 32 and to ground. A terminal a" of the mode switch 24 is connected to: a terminal b", a first terminal of push-button switch 36, a first terminal of a push-button switch 40, and a first input terminal of input drivers 34. A second terminal of the push-button switch 36 is connected to a second terminal of the push-button switch 40 and to a second input terminal of the input drivers 34. A first output terminal of the input drivers 34 is connected to an input terminal 35 of the microprocessor 14 via an optical isolater 42. A second output terminal of the input drivers 34 is connected to an input terminal 37 of the microprocessor 14 via an optical isolator 44. The input drivers 34 provide a clean signal free of contact bounce caused by the mode switch 24 and the push-button switches 36 and 40, to the optical isolators 42 and 44. The optical isolators 42 and 44 isolate the ground of a ±12 volt power supply (not shown in FIG. 2), used by the input drivers 34, from the microprocessor 14.

When the mode switch 24 is in position "a" (the secure position) the wiper terminal 30 is connected to the terminal a', thereby grounding an input terminal of the optical isolator 25 and energizing the STF relay. Also, in this position, the wiper terminal 32 is connected to the terminal a", grounding the first input terminal of the input drivers 34 and enabling the microprocessor 14. If the push-button switch 36 or the push-button switch 40 is depressed when the mode switch 24 is in position "a", the second input terminal of the input drivers 34 is temporarily grounded, thereby requesting operation of the microprocessor 14 in the voice recognition mode.

When the mode switch 24 is in position "b", the train and test mode, the wiper terminal 28 is connected to the terminal b, thereby lighting the VOICE OPERATION DEACTIVATED lamp 26 to indicate that the voice-controlled elevator security system 8 is not controlling the elevator system. The VOICE OPERATION DEACTIVATED lamp 26 is located in the user terminal 18 to advise the user of the status of the voice-controlled elevator security system 8. With the mode switch 24 in position "b", the STF relay is not energized and the elevator system 11 is therefore not responsive to the voice-controlled elevator security system 8. Also, the wiper terminal 32 is connected to the terminal b" grounding the first input terminal of the input drivers 34, enabling the microprocessor 14, and readying the control terminal 10 for input of a spoken word. If the push-button switch 36 or the push-button switch 40 is depressed when the mode switch 24 is in position "b" the second input terminal of the input drivers 34 is temporarily grounded, thereby requesting operation of the microprocessor 14 in the voice recognition mode.

In position "c" (the normal mode) the wiper terminal 28 is connected to the terminal c to light the VOICE OPERATION DEACTIVATED lamp 26, indicating that the voice-controlled elevator security system 8 is not controlling operation of the elevator system 11. In this position the STF relay is not energized, and the microprocessor 14 is disabled since the input terminal 35 thereof is not enabled.

Continuing with the description of FIG. 2 a microphone 46 is responsive to spoken words of the user. A preamplifier 48 is connected to the microphone 46, and when a switch 50 is in a first position the voice recognition module 12 is connected to the preamplifier 48. A preamplifier 52 is connected to a microphone 54, and when the switch 50 is in a second position the voice recognition module 12 is connected to the preamplifier 52. The microphone 54 and the preamplifier 52 are located in the main cabinet 10 and are used for storing template words and testing proper operation of the voice-controlled elevator security system 8. The microphone 46 and the preamplifier 48 are located in the user terminal 18 for use only in the secure operating mode.

An input terminal of an optical isolator 56 is connected to an output terminal 57 of the microprocessor 14. A ground terminal of the optical isolator 56 is connected to the 125 volt power supply return circuit. A first terminal of a PROMPT lamp 58 is connected to an output terminal of the optical isolator 56; a second terminal of the PROMPT lamp 58 is connected to a first terminal of a RECOGNITION CONFIRMED lamp 60 and to the positive 125 volt power supply. A second terminal of the RECOGNITION CONFIRMED lamp 60 is connected to an output terminal of an optical isolator 62; an input terminal of the optical isolator 62 is connected to an output terminal 59 of the microprocessor 14. A ground terminal of the optical isolator 62 is connected to the 125 volt power supply return circuit. In response to the microprocessor 14, the PROMPT lamp 58 and the RECOGNITION CONFIRMED lamp 60, which are located in the user terminal 18, provide status information to the user. A steady glow from the PROMPT lamp 58 indicates that the user is to speak the next word in the sequence of words; a flashing signal from the PROMPT lamp 58 indicates that the user is to repeat the previously spoken word. This repetition enables the voice-controlled elevator security system 8 to re-evaluate the spoken word to determine whether the user is an authorized user. The RECOGNITION CONFIRMED lamp 60 glows steadily when the voice-controlled elevator security system 8 has determined that the user is an authorized user. The optical isolators 56 and 62 isolate the 125 volt power supply circuitry from the microprocessor 14.

A voice response unit 64 is connected to an output terminal 65 of the microprocessor 14. A speaker 68 is connected to the voice response unit 64 via an amplifier 66. The amplifier 66 and the speaker 68 are located in the user terminal 18. The voice response unit 64, the amplifier 66, and the speaker 68 are used as an alternative to the PROMPT lamp 58 for prompting the user to recite the words. The microprocessor 14 produces a signal on the output terminal 65 thereof instructing the voice response unit 64 to provide an electrical signal representative of the prompting word, i.e., the word to be spoken by the user. This electrical signal is amplified by the amplifier 66 and transformed to an acoustical signal by the speaker 68.

An input terminal of an optical isolator 70 is connected to an output terminal 71 of the microprocessor 14 and a ground terminal of the optical isolator 70 is connected to the 125 volt power supply return circuit. A first terminal of a tamper alarm lamp 72 is connected to an output terminal of the optical isolator 70; a second terminal of the tamper alarm lamp 72 is connected to the positive 125 volt power supply. The tamper alarm lamp 72 is a tamper lamp which is lit, on command from the microprocessor 14, when the user has exceeded a predetermined number of attempts allowed in the recognition process. The optical isolator 70 isolates the 125 volt power supply circuitry from the microprocessor 14.

An input terminal 73 of the microprocesosr 14 is connected to a power supply 74 for providing dc operating power. An input terminal of an optical isolator 76 is connected to an output terminal 75 of the microprocessor 14. An output terminal of the optical isolator 76 is connected to a first terminal of an RCW relay coil (not shown) in FIG. 2. The RCW relay, in conjunction with other relays not shown in FIG. 2, controls operation of the elevator system 11. A ground terminal of the optical isolator 76 is connected to the positive 125 volt power supply return circuit. An output terminal 81 of the microprocessor 14 is connected to an input terminal of an optical isolator 78. The optical isolator 78 has a plurality of output terminals that are connected to an elevator interface unit 82 for controlling operation of the elevator system 11. A ground terminal of the optical isolator 78 is connected to the positive 125 volt power supply return circuit. The optical isolators 76 and 78 isolate the 125 volt power supply circuitry from the microprocessor 14.

The RCW relay, the STF relay, and the floor enable relays, in conjunction with the hall call switches 84 and car call switches 86, control operation of the elevator system 11 in the secure mode. The position of these relays, when the user is identified as an authorized user, causes entry of an up hall call at the lowest landing 17 serviced by the elevator system 11 and enables the car call switches 86 for those floors to which the authorized user is permitted access.

Continuing with FIG. 2, a first terminal of a momentary push-button switch 100 is connected to the terminal a" of the mode switch 24; a second terminal thereof is connected to an input terminal of an input driver 102. An output terminal of the input driver 102 is connected to an input terminal of an optical isolator 104. An output terminal of the optical isolator 104 is connected to an input terminal 106 of the microprocessor 14. The momentary push-button switch 100 is for use by users suffering from laryngeal indisposition (i.e., a sore throat). The input driver 102 provides a clean signal, free of contact bounce caused by the momentary push-button switch 100, to the optical isolator 104. The optical isolator 104 isolates the ±12 volt power supply (not shown in FIG. 2), used by the input driver 102, from the microprocessor 14.

In operation, when the mode switch 24 is in the secure mode, a user suffering from laryngeal indisposition (i.e.) a sore throat, pushes the momentary push-button switch 100 a number of times corresponding to the user's number. This grounds the input terminal of the input driver 102 and requests that the microprocessor 14 operate in the laryngeal indisposition train mode. The operation of the microprocessor 14 and the components associated therewith in this laryngeal indisposition train mode is discussed in conjunction with the flow chart of FIG. 3.

Before discussing the laryngeal indispostion train mode in detail, it would be helpful to summarize operation of the microprocessor 14.

When operating in the train and test or secure mode, the microprocessor 14 performs several functions in support of these operational modes. A brief summary of each of these functions follows.

The TRAIN function provides means of extracting the charcteristic features from the words and storing them in digitized form in the voice recognition module 12. As the name implies, this function loads the template words of the authorized users into the voice recognition module 12. To accomplish this, the authorized user, with the assistance of the operator, repeats the spoken words in a specified sequence as prompted by messages on the data entry and display terminal 20.

The UPDATE function allows the authorized user, again with the assistance of the operator, to permanently modify the template words stored in the voice recognition module 12. This is accomplished on a selective basis without affecting all the template words of the authorized user stored in the voice recognition module 12.

The UPLOAD function transfers the template words from the voice recognition module 12 to a random access memory in the microprocessor 14. The DOWNLOAD function transfers the template words from the random access memory in the microprocessor 14 to the voice recognition module 12. The TRANSFER TO VOICE FILE (TTOVF) function transfers the template words from the random access memory in the microprocessor 14 to the non-volatile voice file 16. The RETRIEVE FROM VOICE FILE (RFRVF) function transfers the template words from the voice file 16 to the random access memory in the microprocessor 14.

The SETREJECT function permits adjustment of the comparison criteria used by the voice recognition module 12 to determine whether the user's spoken word matches one of the template words. The SETREJECT function is always used in conjunction with the RECOGNIZE function to be discussed hereinbelow.

The RECOGNIZE function is the primary function for the voice-controlled elevator security system 8. The user requests operation of the voice-controlled elevator security system by activating the switch 36 located in the user terminal 18. The microprocessor 14 responds with an optical prompt signal from the PROMPT lamp 58 or a voice prompt signal through the speaker 68. The user then pronounces the first word previously stored in the voice recognition module 12, into the microphone 46. The PROMPT lamp 58 indicates whether the spoken word has been accepted or rejected (i.e, whether the spoken word matches one of the template words within the dictates of the acceptance/rejection criteria). If the spoken word is accepted, the PROMPT lamp 58 is steadily lit, indicating that the user is to recite the next word in the series. If the word is rejected, the PROMPT lamp 58 flashes, indicating that the user is to repeat the previous word. If each word in a series of spoken words is accepted within a prescribed number of attempts, the RECOGNITION CONFIRMED lamp 60 lights to confirm recognition of the user as an authorized user. As an alternative, a recognition signal from the speaker 68 may be provided. Upon recognition of the authorized user, the microprocessor 14, through the optical isolator 78, enables the floor relays for which the authorized user has access. If the prescribed number of attempts at matching the spoken word with a template word has been exceeded, the tamper alarm lamp 72 is activated.

The TEST function is performed immediately after the TRAIN function to insure the adequacy of the training process. The TEST function bears a close resemblance to the recognize function, except the former does not provide control of the elevator system. The SELECT-FLOOR-ACCESS (FLORMA) function allows each authorized user to select and enter the floors to which the authorized user is permitted access.

Figure 3:
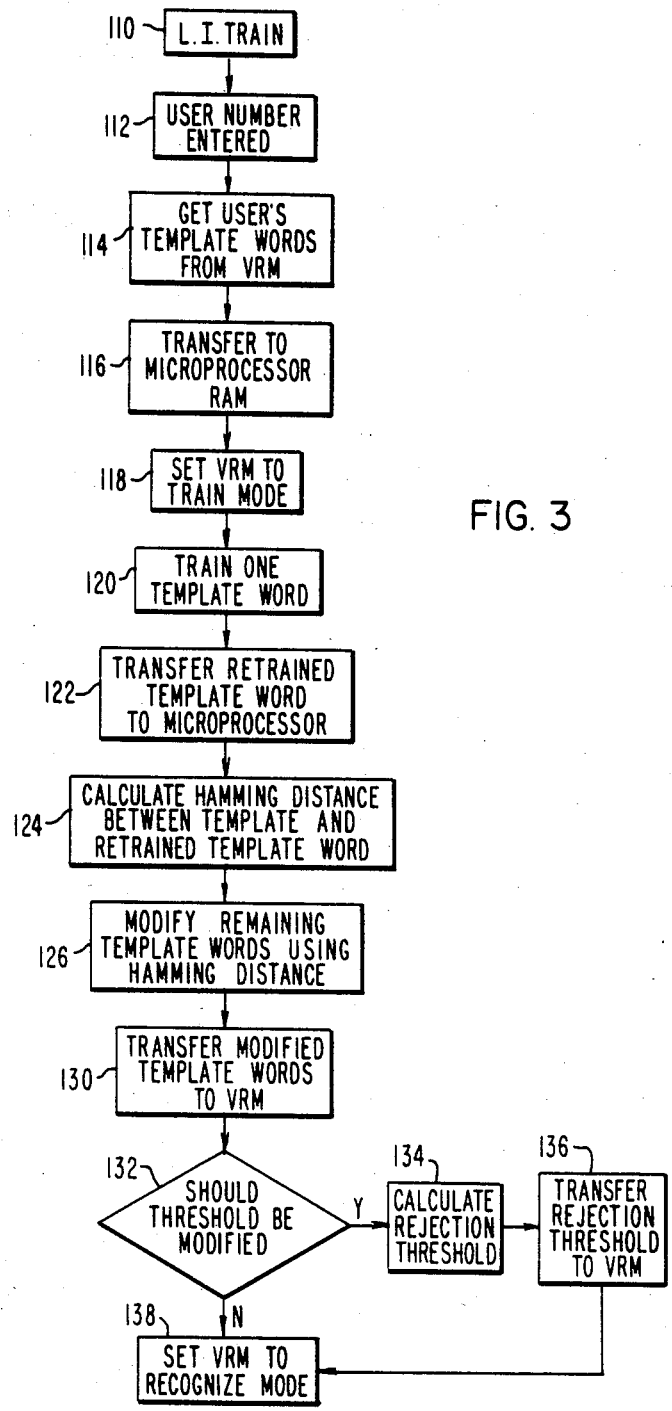
FIG. 3 is a software flow chart illustrating the programming of the microprocessor shown in FIG. 1.

FIG. 3 illustrates a flow chart of the operation of the elevator security system 8 in the laryngeal indisposition train mode. Processing begins at an entry point 110 followed by entry of the user number, using the momentary push-button switch 100, at a step 112. This is done by the user pressing the momentary push-button switch 100 a number of times corresponding to the user's number. At a step 114, the microprocessor gets the user's template words from the voice recognition module 12. At a step 116, the template words are transferred to the random access memory of the microprocessor 14. At a step 118, the voice recognition module 12 is set for operation in the train mode. At a step 120, the user trains a single template word by speaking a word into the microphone 46. The word should be carefully chosen to represent a good average acoustic specimen of the user's vocabulary. The retrained template word is transferred to the microprocessor at a step 122. At a step 124, the microprocessor 14 calculates the Hamming distance vector between the previously stored template word and the just-processed and digitized template word. The Hamming distance vector is the number of unequal binary bits between the retrained template word and the previously stored template word. It represents the correction factor resulting from the laryngeal indisposition affliction. The microprocessor 14 then modifies the remaining template words of the user's vocabulary by the Hamming distance vector, while preserving the original template words in the random access memory of the microprocesor 14. This is accomplished at a step 126. The modified template words are then transferred to the voice recognition module 12 at a step 130.

At a decision step 132, the microprocessor 14 determines whether the threshold should be modified. The threshold is the criteria for determining whether a spoken template word matches a stored template word of a given user. If the Hamming distance calculated at the step 124 exceeds the threshold being used by the microprocessor 14, the threshold must be modified for the user suffering laryngeal indisposition. If at the decision step 132 the microprocessor 14 determines that the number of unequal binary bits between the stored template word and the retrained template word (the Hamming distance vector) exceeds the threshold criteria, processing moves to a step 134. At the step 134, the microprocessor 14 calculates a new rejection threshold, and at a step 136 the new rejection threshold is transferred to the voice recognition module 12. If the decision at the decision step 132 is negative, processing moves immediately to a step 138 where the voice recognition module 12 is set to the RECOGNIZE mode for determining if the user is an authorized user. Of course, in making this determination, the voice recognition module 12 utilizes the modified template words. Processing also moves to the step 138 after the new rejection threshold has been transferred to the voice recognition module 12 at the step 136.

It should be noted that this invention for selecting authorized users when an authorized user's voice characteristics might be different from those when the template words were generated and later stored in the voice file 16, provides only a *temporary* modification. The template words stored in the voice file 16 are *not* permanently modified by the Hamming distance vector calculated at the step 124. The initial template words, i.e., before modification, are also available in the microprocessor 14 and are transferred to the voice recognition module 12 after completion of the recognition process for the user suffering from laryngeal indisposition, thus restoring the template to its original form. This modification to the elevator security system 8 is necessary so that the elevator security system 8 can provide reliable operation under the common, real life situation where users may be suffering from various ailments that temporarily affect their voice characteristics.

What is claimed is:

1. A voice-controlled elevator security system, including at least one elevator car mounted in a building having a plurality of floors, including a lobby floor, wherein authorized users are each pre-enabled to gain access to a predetermined floor, or floors, of the building from the lobby floor and each authorized user has provided template utterances, said voice-controlled elevator security system comprising:

first memory means for storing template utterances of authorized users, with said template utterances being represented by a plurality of binary bits;

second memory means for storing preselected floors to which each authorized user is permitted access;

digitizing means for digitizing a prospective user's spoken utterance, with the user's digitized spoken utterance being represented by a plurality of binary bits;

modification means;

switch means actuatable by a prospective user for activating said modification means;

said modification means, when actuated, providing modified template utterances of an authorized user in response to the digitized spoken utterance of a prospective user, and to the template utterances stored in said first memory means, with the modified template utterances being represented by a plurality of binary bits;

third memory means for storing said modified template utterances;

recognition means for comparing the prospective user's digitized spoken utterance with the template utterances stored in the first memory means, when said modification means is deactivated, to determine the largest number of binary bits in agreement between the digitized spoken utterance of the prospective user and the template utterances stored in said first memory means;

said recognition means comparing the prospective user's digitized spoken utterance with the modified template utterances stored in said third memory means, when said modification means is activated, to determine the largest number of binary bits in agreement between the digitized spoken utterance of the prospective user and the template utterance stored in said third memory means;

threshold means for establishing a threshold limit;

comparator means for comparing said largest number of binary bits in agreement determined by said recognition means with said threshold limit and for producing an enable signal when said largest number of binary bits in agreement exceeds said threshold limit;

said enable signal indicating that the prospective user is an authorized user;

and call selecting means responsive to said enable signal for enabling a recognized authorized user to gain access to an elevator car at the lobby floor;

said call selecting means further being responsive to said enable signal for enabling the recognized authorized user to direct the accessed elevator car only to an associated pre-enabled floor stored in said second memory means;

said call selecting means including floor selecting means in the at least one elevator car and up-call selecting means at the lobby floor, wherein activation of the voice controlled elevator security system disables the floor selecting means in the at least one elevator car, except the floor selecting means for the lobby floor and disables the up-call selecting means on the lobby floor, and wherein indentification of the user as an authorized user automatically activates the up-call selecting means at the lobby floor and enables the floor selecting means in the at least one elevator car for said pre-enabled floors.

2. The voice-controlled elevator security system of claim 1 wherein the switch means includes a momentary push-button switch, and including fourth memory means for storing a code associated with said push-button switch and each authorized user, with the modification means being activated only for the authorized user associated with predetermined code stored in said fourth memory means, when said predetermined code is entered by said push-button switch.

3. The voice-controlled elevator security system of claim 1 wherein the digitizing means digitizes an utterance spoken after the activation of the modification means, to obtain a retrained template word for use in modifying template utterances stored in the first memory means to provide the modified template utterances which are stored in the third memory means.

4. The voice-controlled elevator security system of claim 3 wherein the modification means is responsive to the retrained template word and an associated one of template utterances stored in the first memory means for determining the number of unequal binary bits between them, and wherein the number of unequal binary bits is used by the modification means to modify template utterances stored in the first memory means to produce modified template utterances for storing in the third memory means.

5. The voice-controlled elevator security system of claim 4 wherein the threshold limit provided by the threshold means is functionally related to the number of unequal binary bits.

* * * * *